United States Patent
Holmes et al.

(10) Patent No.: US 9,541,635 B2
(45) Date of Patent: Jan. 10, 2017

(54) LASER PHASE DIVERSITY FOR BEAM CONTROL IN PHASED LASER ARRAYS

(71) Applicant: The Boeing Company, Chicago, IL (US)

(72) Inventors: Richard B. Holmes, Cameron Park, CA (US); David R. Gerwe, West Hills, CA (US); Paul S. Idell, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 14/643,351

(22) Filed: Mar. 10, 2015

(65) Prior Publication Data
US 2016/0266244 A1   Sep. 15, 2016

(51) Int. Cl.
| | |
|---|---|
| *G01J 1/20* | (2006.01) |
| *G01S 7/491* | (2006.01) |
| *G01S 7/495* | (2006.01) |
| *G01S 17/66* | (2006.01) |

(52) U.S. Cl.
CPC .............. *G01S 7/4911* (2013.01); *G01S 7/495* (2013.01); *G01S 17/66* (2013.01)

(58) Field of Classification Search
CPC ......... G01S 7/4911; G01S 7/495; G01S 17/16
USPC ............................................ 250/201.9; 372/6
See application file for complete search history.

(56) References Cited

U.S. PATENT DOCUMENTS

2007/0278386 A1* 12/2007 Paxman ............... G01J 9/00
250/208.1

* cited by examiner

*Primary Examiner* — Thanh Luu
(74) *Attorney, Agent, or Firm* — Ostrager Chong Flaherty & Broitman P.C.

(57) ABSTRACT

Systems and methods that combine forward-model image reconstruction techniques with tomographic estimation of three-dimensional atmospheric turbulence to enable high-quality anisoplanatic imaging and beam control through the atmosphere over an extended field of view using a phased laser array. The system projects laser energy onto specific locations of extended objects in various geometries, overcomes atmospheric anisoplanatism and backscatter; estimates phase across the full aperture, and reconstructs the target object in great detail to enable high-resolution aim-point selection and maintenance. Aimpoint maintenance is performed by sequentially analyzing a passive image and a laser spot in rapid succession, in each subaperture at high signal-to-noise ratio. As a further improvement, backscatter issues from the projected laser beam are eliminated by cycling the laser and/or sequentially lasing on different wavelengths within the laser gain bandwidth.

19 Claims, 5 Drawing Sheets

LASER PHASE DIVERSITY FOR BEAM CONTROL IN PHASED LASER ARRAYS

BACKGROUND

This disclosure generally relates to systems and methods for anisoplanatic imaging and beam control over an extended field of view (FOV) using phased laser arrays. In particular, this disclosure relates to systems and methods for compensating for the effects of atmospheric turbulence when projecting laser energy onto specific locations of extended objects such as orbiting objects, missiles, and airplanes.

Laser radar systems are used to transmit laser beams toward a target, receive light scattered from the target, and then process the received light to extract information about the target, such as range, velocity, vibrations, shape, materials, and surface properties such as texture or color. Laser radar systems can be used for intelligence gathering, surveillance and reconnaissance imaging, target discrimination and designation, and adaptations can be made to implement optical/laser communications, energy beaming, and directed energy weapons capabilities. However, performing these functions can be difficult when the laser beam and scattered light must pass through atmospheric turbulence, which distorts optical wavefronts and hence degrades images. Implementing these systems as phased laser arrays offers the advantages of providing reduced system size and weight while offering an architecture that scales better and degrades more gracefully with laser faults than a single large power laser source. It is these advantages that motivate the consideration of atmospheric mitigation systems for phased array lasers disclosed herein.

It is known that atmospheric turbulence-induced aberrations limit the useable aperture of telescopes. When light from a star or another astronomical object enters the Earth's atmosphere, atmospheric turbulence (introduced, for example, by different temperature layers and different wind speeds interacting) can distort and move the image in various ways. Images produced by any telescope larger than 10 cm in diameter are blurred by these distortions. The blur changes rapidly, so that in long-exposure images the higher spatial frequencies are wiped out. One way of dealing with this problem is to correct the wavefront using real-time adaptive optics. A complementary approach is to use speckle imaging techniques, in which an image is reconstructed from many short exposures.

Adaptive optics is inherently an isoplanatic technology, i.e., it assumes that the turbulence effect is constant over an angle termed the "isoplanatic angle". In fact, the wavefront distortion due to turbulence is spatially varying due to anisoplanatic conditions, while the isoplanatic angle varies with atmospheric conditions. Adaptive optical correction of an extended region consisting of multiple isoplanatic patches (i.e., temporally coherent paths) requires significant added complexity in the adaptive optics system.

Anisoplanatism is also a concern when a high-energy laser beam is aimed at an incoming missile or aircraft for the purpose of damaging or destroying it. To accomplish this goal, it is important to deliver a maximum amount of energy density (energy per unit area) to the target, for example, by minimizing the footprint of the illuminating beam. This in turn may require that the transmitted laser beam be predistorted in a way such that it will become undistorted after it has propagated through the turbulent atmosphere to the target. Since the distortions vary with look angle, the system should be able to measure and apply predistortions over an extended range of angles.

To phase an array of lasers onto a point on a distant object moving in or above the atmosphere, an optical path difference (OPD) map must be estimated accurately for each laser to the point of interest on the object. If an array of lasers is arranged in a regular square or hexagonal array, then the array pupil is similar to a well-known Shack-Hartmann wavefront sensor configuration. It is well known that a Shack-Hartmann wavefront sensor can sense local tilts and that such local tilts can be used to reconstruct a wavefront over the entire array. If the source object is unresolved (an unresolved target is one that lies entirely within the spot size of the diffraction limited illumination beam), such a reconstructed wavefront would be appropriate for application to a phased laser array to concentrate energy onto the unresolved object.

However, when the target object is extended (i.e., the target has a size larger than the illumination beam spot size), two significant complications may arise. First, an aimpoint must be selected that is based on the resolution of the entire laser array. This poses the problem of how to create such a high-resolution image from an array of smaller subapertures, each of which has lower resolution. Second, if the object occupies multiple isoplanatic patches, then there is a different wavefront apropos for each isoplanatic patch subtended by the object. This poses the problem of how to extract the wavefront that is specific to the aimpoint. A third issue is backscatter. Some known phased array concepts rely on a single-wavelength laser, and have used various homodyne or heterodyne (i.e., coherent) detection techniques that measure complex field amplitudes. These techniques include digital holography and sheared-beam imaging. Such techniques suffer from laser backscatter that interferes with the signal returned from the target, which presents a difficulty. In addition, coherent detection techniques are more difficult than direct (incoherent) detection techniques because they typically require more coherent lasers and often require path and frequency matching of a local oscillator to a target return.

It would be advantageous to provide a phased laser array system that overcomes the aforementioned problems and is capable of high-quality anisoplanatic imaging and beam control through the atmosphere over an extended field of view.

SUMMARY

The subject matter disclosed in detail below is directed to systems and methods for anisoplanatic imaging and beam control that utilize incoherent detection techniques rather than coherent detection techniques. The concept disclosed herein measures intensities, not complex field amplitudes. The measurement of intensities is vastly easier than coherent field detection and measurement. As used herein, "imaging data" means electronic pixel values that represent intensities of light impinging on pixel elements of a focal plane array.

More specifically, the approach disclosed herein combines forward-model image reconstruction techniques with tomographic estimation of three-dimensional atmospheric turbulence to enable high-quality anisoplanatic imaging and beam control through the atmosphere over an extended field of view using a phased laser array. The approach disclosed herein is directed towards projection of laser energy onto specific locations of extended objects in various geometries, is readily implementable, and offers several key advantages over other implementations: no additional aperture is needed beyond the high-energy laser (HEL) aperture; heterodyne sensing is not needed; it should work in strong-turbulence conditions; it overcomes atmospheric backscatter; and it estimates phase across the full aperture and reconstructs the target object in great detail to enable high-resolution aimpoint selection and maintenance. This approach builds on known phase tomography concepts as well as known image reconstruction theory and diversity techniques to enable reconstruction of images much larger than an isoplanatic patch angle, because it estimates the entire volume of aberrations in the atmosphere between the object and the receiver. This extended-object imaging enables aimpoint selection and phase control to coherently project energy onto a specific location on an extended object. Aimpoint maintenance is performed by sequentially analyzing a passive image and one or more laser spots at different wavelengths in rapid succession, in each subaperture at high signal-to-noise ratio (SNR). As a further improvement, backscatter issues from the projected laser beam are eliminated by cycling the laser and/or sequentially lasing on different wavelengths within the laser gain bandwidth.

To address the issues mentioned above (to wit, creating a high-resolution image from an array of smaller subapertures, extracting the wavefront that is specific to the aimpoint, and reducing the deleterious effects of backscatter), the approach adopted herein uses atmospheric tomography and phase diversity. Atmospheric phase tomography was conceived in the context of adaptive optics. However, as previously mentioned, adaptive optics is inherently an isoplanatic technology. Adaptive optical correction of an extended region consisting of multiple isoplanatic patches requires significant added complexity in the adaptive optics system. On the other hand, image reconstruction and aperture partitioning technologies hold significant promise for utilizing the benefits of atmospheric phase tomography without the added complexity of adaptive optics. This capability includes anisoplanatic imaging and imaging with large apertures. Combining these approaches with phasing aided by coherent illumination and a laser duty cycle involving at least one laser wavelength projected in sequence and with passive imaging enables full-aperture pointing and phasing and aimpoint maintenance, as described in detail below.

One aspect of the subject matter disclosed in detail below is a system comprising a beam director and a multiplicity of laser channels arranged for transmitting light to and receiving light from the beam director, wherein each of the laser channels comprises: a laser for outputting a laser beamlet; a phase modulator for modulating a phase of the laser beamlet output by the laser; a polarizing beam splitter arranged such that a laser beamlet output by the laser will impinge on the polarizing beam splitter; a diverging lens arranged such that laser light transmitted through the polarizing beam splitter will impinge on the diverging lens, wherein the diverging lens is displaceable in three mutually orthogonal directions; a primary lenslet arranged such that laser light transmitted through the diverging lens will impinge on the primary lenslet and laser light transmitted through the primary lenslet will impinge on the beam director; a set of actuators for actuating displacement of the diverging lens in the three mutually orthogonal directions; and a focal plane array arranged such that light that passed through the diverging lens and then impinged on the polarizing beam splitter will impinge on the focal plane array, the focal plane array converting impinging light into electronic imaging data.

In accordance with some embodiments, each laser channel further comprises: a retro-reflector, a quarter-wave plate, and a spectral filter, the retro-reflector and quarter-wave plate being disposed so that light from the laser that was reflected by the polarizing beam splitter will pass through the quarter-wave plate, impinge on the retro-reflector and be reflected back toward and through the quarter-wave plate and then through the polarizing beam splitter, and the spectral filter being disposed between the polarizing beam splitter and the focal plane array in a position whereat light that was reflected by the polarizing beam splitter toward the retro-reflector and then back will impinge on the spectral filter and light passed by the spectral filter will impinge on the focal plane array. The polarizing beam splitter reflects only a horizontally polarized fraction of the laser beamlet output by the laser, while the spectral filter is tuned to pass a range of wavelengths which does not include a wavelength of light that is currently being output by the laser.

The system may further comprise: a multiplicity of sets of actuators for actuating mutually orthogonal displacements of a multiplicity of diverging lens; and a computer system that receives incoherent imaging data from a multiplicity of focal plane arrays, the computer system being programmed to transmit control data to the sets of actuators and phase data to the phase modulators, the control and phase data being derived from the incoherent imaging data by reconstructing full-aperture wavefronts using a multi-frame blind deconvolution algorithm, a forward model, or integration of subaperture tilts. The computer system may be further programmed to perform the following operations: control the sets of actuators to provide tip, tilt and focus control of the diverging lenses; control the phase modulators to adjust phases of laser beamlets output by the lasers; and control firing and wavelength of the lasers to output laser beamlets to the phase modulators, wherein the tip, tilt and focus control and the phase adjustments are designed to direct the laser beamlets toward an aimpoint on a target object in a field of view of the beam director with compensation for the atmospheric turbulence-induced phase aberrations specific to a path to an aimpoint region using a combination of focus diversity or phase tomography to estimate the phase. As used herein, the term "aimpoint region" means a region of vulnerability on a target object.

Another aspect of the subject matter disclosed in detail below is a method for concentrating a laser beam formed by a laser array on an aimpoint on a target object in a field of view of a beam director, comprising: (a) acquiring a multiplicity of incoherent images of the target object while applying phase diversity and while the laser array is turned off; (b) reconstructing full-aperture wavefronts for each isoplanatic patch of the target object from the incoherent images using a combination of focus diversity or phase tomography based on subaperture image measurements; (c) reconstructing a multiplicity of subaperture images with reduced blurring due to phase aberrations from the incoherent images; (d) selecting a crude aimpoint close to or inside an aimpoint region based on the multiplicity of reconstructed subaperture images; and (e) firing a multiplicity of lasers using a reconstructed global phase appropriate for an isoplanatic patch around the crude aimpoint. In accordance with some embodiments, the method further comprises modulating phases of laser beamlets using gross-piston phase modulators and positioning diverging lenses for tip/tilt and focus control for each laser channel. In accordance with one embodiment, step (e) comprises transmitting multiple laser wavelengths from each laser, and the method further comprises: (f) recording coherent returns reflected from the target object to form speckle images for each laser channel; (g) processing the speckle images and the passive images to separate speckle phase from atmospheric phase, the result of which is a reconstruction of a global atmospheric phase and a multiplicity of subaperture speckle phases; and (h) reconstructing a global speckle phase from the multiplicity of subaperture speckle phases. The above-described method may further comprise: estimating the laser piston phase from the lenslet array out to the target object based on the global speckle phase; and applying the piston, along with tip, tilt, and focus adjustments for each laser channel, to concentrate the laser beamlets on a more precise aimpoint inside the aimpoint region on the target object.

A further aspect of the disclosed subject matter is a system comprising a laser array, a lenslet array, a multiplicity of focal plane arrays, a multiplicity of polarizing beam splitters, and a multiplicity of sets of actuators, wherein: the laser array comprises a multiplicity of phase modulators; the lenslet array comprises a multiplicity of diverging lenses, each of the diverging lenses being independently displaceable in three mutually orthogonal directions by a respective set of the multiplicity of sets of actuators; the polarizing beam splitters are respectively disposed between a respective laser of the laser array and a respective diverging lens such that a respective laser beamlet output by the respective laser will first pass through a respective polarizing beam splitter and then pass through a respective diverging lens; the focal plane arrays are respectively arranged such that light that has passed through a respective diverging lens and then impinged on a respective polarizing beam splitter will impinge on the respective focal plane array, the focal plane arrays converting impinging light into electronic imaging data; and the computer system receives incoherent imaging data from the focal plane arrays, the computer system being programmed to transmit control data to the multiplicity of the sets of actuators for causing displacements of the diverging lenses and phase data to the phase modulators for setting the overall subaperture phase, the control data and phase data being derived from the incoherent imaging data by reconstructing full-aperture wavefronts of atmospheric turbulence-induced phase aberrations using a multi-frame blind deconvolution algorithm, a forward model, or integration of subaperture tilts. The computer system may be further programmed to perform the following operations: control the sets of actuators to provide tip, tilt and focus control of the diverging lenses; and control firing of the lasers to output laser beamlets, wherein the tip, tilt and focus control are designed to direct the laser beamlets toward an aimpoint on a target object with compensation for the atmospheric turbulence-induced phase aberrations.

Other aspects of systems and methods for anisoplanatic imaging and beam control through the atmosphere over an extended field of view using phased laser arrays are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of systems and methods for anisoplanatic imaging and beam control over an extended field of view using a phased laser array, with compensation for atmospheric turbulence-induced distortions, will now be described in detail for the purpose of illustration. The basic approach involves a laser array and a lenslet array. As used herein, the term "array" used in conjunction with elements such as lasers, lenses, and so forth includes a multiplicity of those elements, which elements may be fixed or movable relative to each other. In the disclosed embodiments, the lenslet array comprises a multiplicity of diverging lens which are movable along three axes. Each laser channel (referred to as a subaperture in this disclosure) has a small focal plane array (FPA) imaging tracker and a diverging lens with fine motion control. Additionally, for each laser channel there is typically a phase (gross piston phase) modulator and a collimating/focusing lens. Each diverging lens is actuated for small motions along and/or transverse to a line of sight. The fine motion control of the diverging lens enables tip/tilt/focus control.

Figure 1:
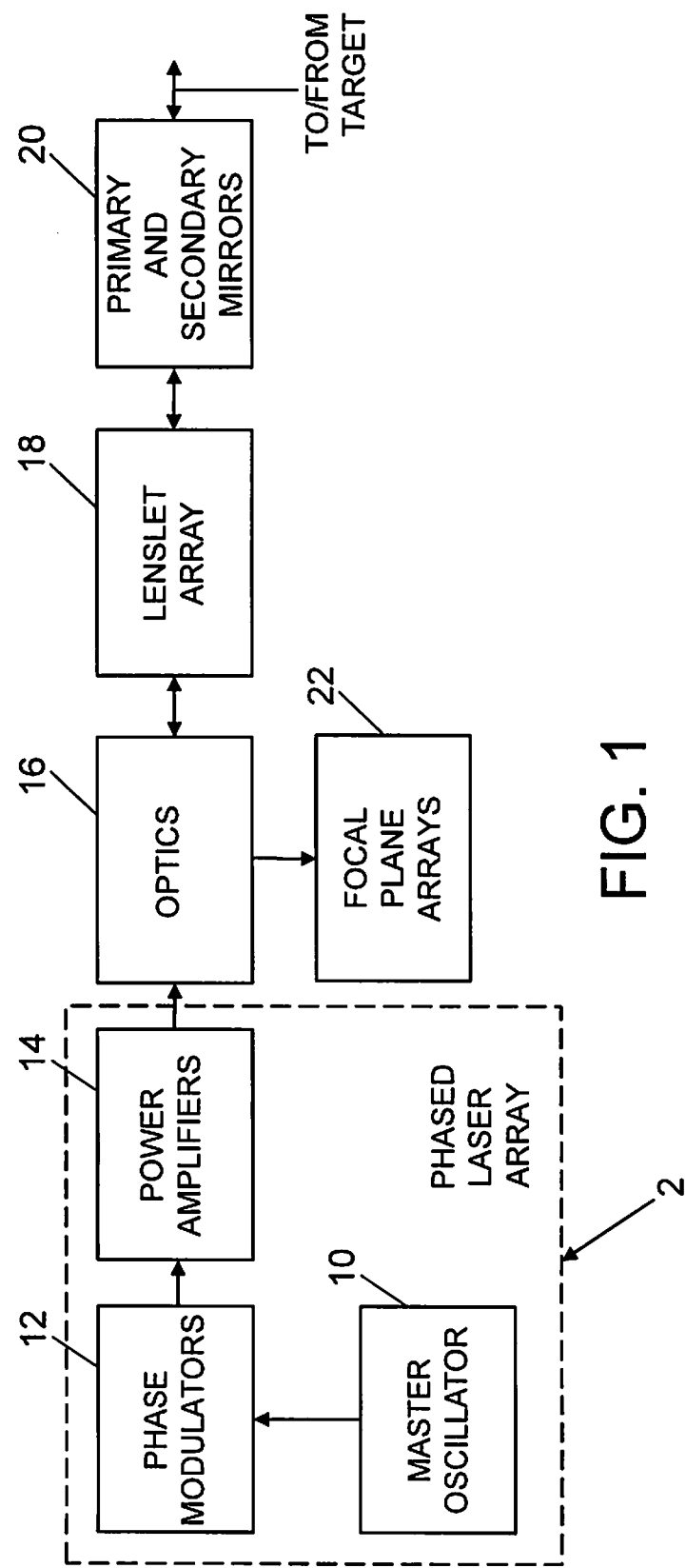
FIG. 1 is a block diagram showing some components of a compact high-performance phased laser array system in accordance with one embodiment.

Some components of an imaging system in accordance with one embodiment are shown in FIG. 1. The system comprises a phased laser array 2, respective sets of optical elements 16 (one set per laser channel), respective focal plane arrays 22 (one focal plane array per laser channel), a lenslet array 18, and a telescope 20 comprising a primary mirror and a secondary mirror. As indicated by arrows in FIG. 1, light output by the phased laser array 2 passes through the optical elements 16 and then through the lenslet array 18, and then is transmitted by the telescope 20, whereas light received by the telescope 20 is passed through the lenslet array 18 and then is diverted by the optical elements 16 toward the focal plane arrays 22.

Still referring to FIG. 1, the phased laser array 2 comprises a master oscillator 10 which produces an optical signal, a splitter (not shown) which splits the optical signal into a multiplicity of laser beamlets, a multiplicity of phase modulators 12 which modulate the phases of respective beamlets, and a multiplicity of power amplifiers 14 which amplify the intensities of respective beamlets.

Figure 2:
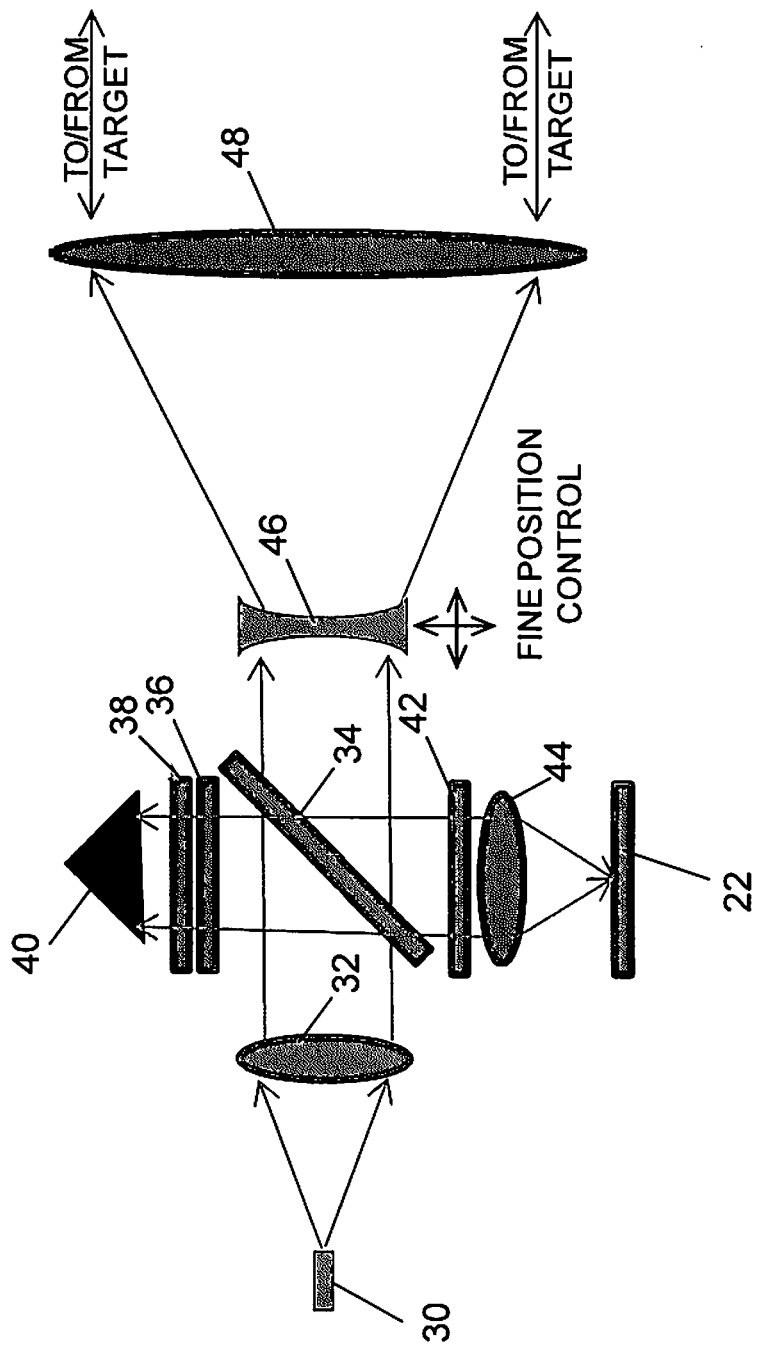
FIG. 2 is a diagram showing some components of an optical system incorporated in each laser channel of the optics and lenslet array blocks depicted in FIG. 1.

FIG. 2 is a diagram representing some components of an optical subsystem incorporated in each laser channel of the system depicted in FIG. 1. These optical components encompass the optics 16, lenslet array 18 and focal plane arrays 22 indicated in the block diagram of FIG. 1.

Each laser channel comprises a laser source (not shown in FIG. 2) coupled to an optical fiber. Only the tip 30 of that optical fiber is depicted in FIG. 2. The laser beamlet output from the optical fiber tip 30 first passes through a collimating lens/clipper 32 and then impinges on a polarizing beam splitter 34. Beam-splitting polarizers split the incident beam into two beams of differing linear polarization. If such a beam splitter is slightly rotated along the optical propagation axis from the nominal direction of incident polarization, a small fraction of the incident polarized light will be reflected. Alternatively, if the laser beam coming from the laser has a mixture of polarization states, then a small fraction of its light is reflected by the polarizing beam splitter. In the embodiment depicted in FIG. 2, the polarizing beam splitter 34 reflects the fraction of the beamlet toward a retro-reflector 40, which reflected fraction is horizontally polarized. The light passing through the polarizing beam splitter 34 and onto the diverging lens 46 typically contains vertically polarized light. After reflection from the target, the returning light would have a mixture of polarization states.

On its way from the polarizing beam splitter 34 to the retro-reflector 40, the horizontally polarized light passes through an attenuator 36 and a quarter-wave plate 38. (The relative positions of the attenuator 36 and quarter-wave plate 38 can be as depicted in FIG. 2 or the reverse.) In this first pass, the quarter-wave plate 38 converts the horizontally polarized light reflected by the polarizing beam splitter 34 into circularly polarized light which is reflected by the retro-reflector 40 back toward the polarizing beam splitter 34. This reflected circularly polarized light passes through the quarter-wave plate 38 and attenuator 36. In this second pass, the quarter-wave plate 38 converts the circularly polarized light reflected by the retroflector 40 into vertically polarized light which passes through the polarizing beam splitter 34, a spectral filter 42, and a focusing lens 44 in sequence and then impinges on the focal plane array. The attenuator 36 attenuates the intensity of the light impinging on the highly sensitive focal plane array 22 to protect the latter against damage. The polarizing beam splitter 34, retro-reflector 40, and focal plane array 22 in FIG. 2 (in conjunction with computer 6 shown in FIG. 3) form a common path/common mode (CPCM) system that determines the direction of the laser beamlet. The double-passed quarter-wave plate 38 and the attenuator 36 in FIG. 2 ensure that a reasonable amount of laser light is sent to the focal plane array 22 to perform CPCM tracking.

The light which was not reflected by the polarizing beam splitter 34 toward the retro-reflector 40 will pass first through a diverging lens 46 and then through a primary lenslet 48. As previously mentioned, the lenslet array 18 shown in FIG. 1 comprises a multiplicity of sets of lenses, each lens set consisting of a diverging lens 46 and a primary lenslet 48. Each laser channel includes one such lens set. The diverging lens 46 can be moved along the optical axis to control the focus of each beamlet and can be moved along the axes transverse to the optical axis to control tip and tilt of the beamlet wavefront. The laser beamlet emitted from the primary lenslet 48 is then directed toward the target by the telescope 20.

Light impinging on the primary mirror of the telescope 20 (including light reflected by the target and light backscattered by the atmosphere) will be reflected by the secondary mirror toward the primary lenslet 48. The primary lenslet 48 focuses light reflected from the secondary mirror through the diverging lens 46 and onto the polarizing beam splitter 34. The horizontally polarized component of the impinging light is directed by the polarizing beam splitter 34 onto the focal plane array 22, thereby reducing backscatter because the outgoing light is vertically polarized.

Figure 3:
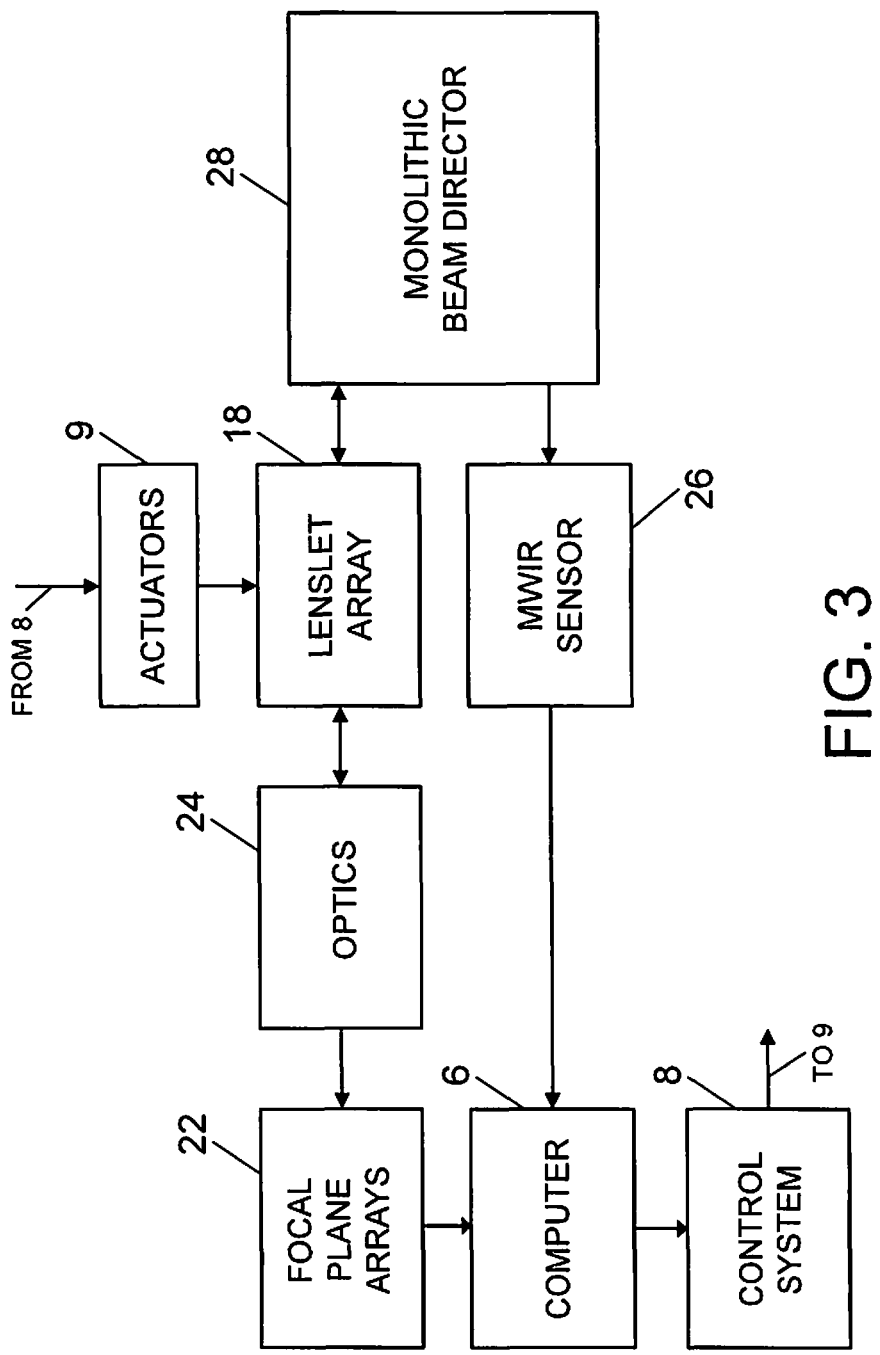
FIG. 3 is a block diagram showing some of the same and additional components of the system depicted in FIG. 1, with emphasis on the wavefront control and imaging components. Although not shown in FIG. 3, this system also includes a master oscillator, a multiplicity of phase modulators, and a laser power amplifier array arranged as shown in FIG. 1.

FIG. 3 shows some of the same and additional components of the system depicted in FIG. 1. Although not shown in FIG. 3, the overall laser system also includes a master oscillator, a multiplicity of phase modulators, and a laser power amplifier array arranged as shown in FIG. 1. It should also be noted that the monolithic beam director 28 seen in FIG. 3 represents an apparatus for directing the phased laser beamlets toward an aimpoint on the target object. The telescope 20 shown in FIG. 1 is one such apparatus.

In accordance with the embodiment depicted in FIG. 3, the system may further comprise a mid-wavelength infrared (MWIR) sensor 26 which receives infrared signals captured by the monolithic beam director 28. This sensor could be installed in one of the laser channels of the array or could be a separate wide-FOV aperture as depicted in FIG. 3. This may entail a larger acquisition telescope in the MWIR sensor, possibly combined with a boresighted single-laser-channel illuminator.

The system further comprises a computer 6 which receives imaging data from the MWIR sensor 26. The computer 6 may be programmed to process the imaging data from the MWIR sensor 26, using pattern recognition software (or other suitable software) to recognize the presence of an object of interest in the FOV of the monolithic beam director 28. The computer 6 may be further programmed to control actuators for adjusting the angular position of the monolithic beam director 28 so that the object of interest is closer to the center of the FOV.

In accordance with the methodology disclosed in more detail below, the computer 6 also receives passive imaging data from the focal plane arrays 22. The computer 6 may be programmed to sample passive imaging data, estimate a three-dimensional atmospheric phase profile, and reconstruct a full-aperture image with reduced blurring caused by atmospheric phase aberrations.

The computer 6 may be further programmed to send control information to a control system 8, which in turn sends control signals to a multiplicity of actuators 9, which are used to move the multiplicity of diverging lenses (such as the diverging lens 46 depicted in FIG. 2) independently in three mutually orthogonal directions for tip/tilt/focus control of the laser beamlets during the directed energy weapon phase. The control system 8 may also control the phase modulators 12 (shown in FIG. 1) in accordance with phase information received from the computer 6. The control system 8 may comprise a computer or processor distinct from the computer 6.

One embodiment of a process for operating the system depicted on a high level in FIG. 3 will now be described with reference to FIG. 4. This process, which enables high-quality anisoplanatic imaging and beam control through the atmosphere over an extended field of view using phased laser arrays, may comprise the following steps:

(1) First, the target object may be acquired by the MWIR sensor 26 (see step 70 in FIG. 4), which receives infrared signals captured by the monolithic beam director 28. The computer 6 is programmed to adjust the angular position of the monolithic beam director 28 so that the object of interest is closer to the center of the FOV.

(2) The target object is then imaged (acquired) in each of the laser (i.e., subaperture) channels on respective focal plane arrays 22 that form passive (i.e., the lasers are not on), incoherent subaperture images (step 72). A short sequence of these images is acquired while the lasers are not operating. This sequence may acquire several image frames with a deliberate defocus (by changing the position of the diverging lens along the optical axis) applied to support phase diversity processing. The computer 6 is programmed with image tracking software (hereinafter "imaging trackers") which samples the passive incoherent images acquired by the respective focal plane arrays 22. Preferably the imaging trackers sample their respective images at a density of points at least as fine as the Nyquist rate. In angular terms, this is $\lambda/2D$, where $\lambda$ is the mean wavelength of operation for the imaging tracker, and D is the subaperture diameter. However, this is not a necessity; the system could use imaging trackers with coarser sampling than Nyquist, possibly with some degradation in performance. Alternatively, instead of passive imaging, one could illuminate the object with many wavelengths in parallel or in sequence to synthetically create wavelength diversity.

Figure 4:
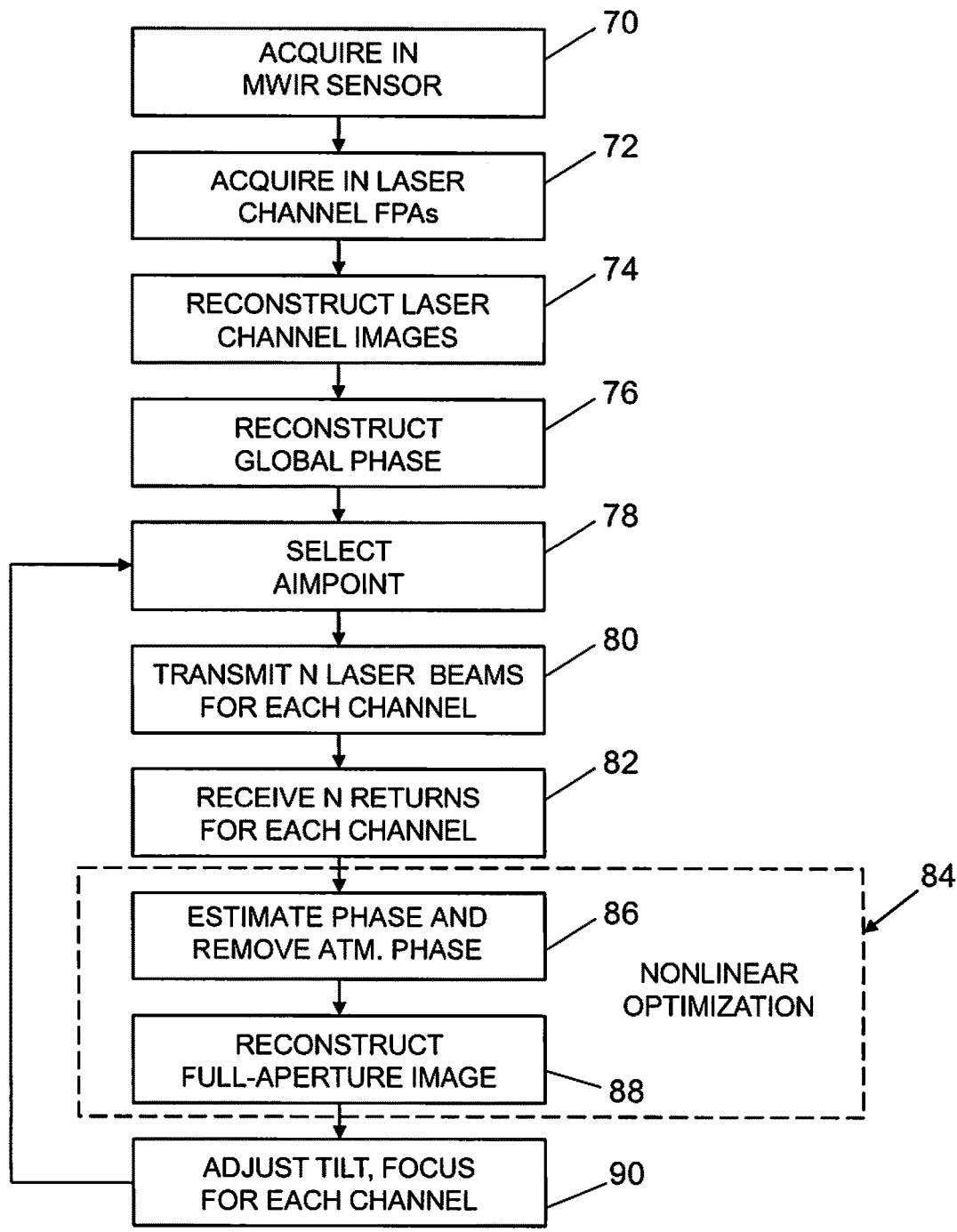
FIG. 4 is a flowchart showing steps of a method for controlling a phased laser array to direct a multiplicity of laser beams toward an aimpoint on a target object in accordance with one embodiment.

(3) Subaperture wavefronts (having subaperture phases) and a full-aperture wavefront (having a global phase) are reconstructed by computer 6 from the sequence of recorded passive subaperture images (see steps 74 and 76 in FIG. 4). The computer 6 may be programmed to utilize a standard wavefront reconstructor using subaperture centroids if the object is within one isoplanatic patch. The local tilts can be derived from the centroids; the tilts can then be integrated to reconstruct the wavefronts for each subaperture. In addition, the computer programming can be extended using multi-frame blind deconvolution (MFBD) algorithms to adaptively estimate the wavefront over the whole aperture for each isoplanatic patch of the target object (and also estimate wavefronts within subapertures). That a full-aperture wavefront with global phase can be reconstructed is evident by seeing the similarity of the phased laser array hardware to a Shack-Hartmann wavefront sensor. Extending basic MFBD to jointly process the data from each subaperture reconstructs the wavefront over the combined aperture by enforcing continuity in the wavefront across subaperture boundaries and the relative shifts between the subaperture images to wavefront tip/tilt. Note that each isoplanatic patch can be reconstructed using some combination of focus diversity or phase tomography, as will be described in more detail below.

(4) Next a crude aimpoint close to or inside an aimpoint region is selected based on the subaperture images (step 78) and the lasers are fired with phasing (step 80) based on the subaperture phases (at this point in the process there is no guarantee that a high-quality full-aperture image has been acquired). The crude aimpoint may be selected manually by the system operator or automatically by the computer 6.

(a) The reconstructed global phase (the global phase is defined as the average wavefront, based on an average of wavefronts from all isoplanatic patches corresponding to all portions of the object or region of interest) is applied to all of the laser channels, using a combination of the gross-piston phase modulators 12 and the positioning of the diverging lens 46 for tip/tilt and focus control for each laser channel (see FIG. 1). The reconstructed global phase appropriate for the isoplanatic patch around the aimpoint is used if possible at this point in the processing.

(b) Next at least one narrow-band wavelength beam is transmitted from each of the lasers. A duty cycle of no more than 50% is used if only one wavelength is used to eliminate backscatter. If N colors are used, each color is used for a duration of $1/(N+M)$ multiplied by the round-trip time to the target object. (N+M is used instead of N to account for M intervals in which a passive image is formed. M can be zero if N is greater than unity.) As previously mentioned, the polarizing beam splitter 34, retro-reflector 40, and focal plane array 22 in FIG. 2 form a CPCM system. The double-passed quarter-wave plate 38 and the attenuator 36 in FIG. 2 ensure that a reasonable amount of laser light is sent to the focal plane array 22 to perform CPCM tracking.

(5) For each of the N wavelength transmissions, the coherent return that is reflected from the target object onto the focal plane array 22 is recorded in memory by the computer 6 (step 82). The horizontally polarized component of the impinging light from the telescope is directed by the polarizing beam splitter 24 onto the focal plane array 22, thereby reducing backscatter from the atmosphere (which is predominantly vertically polarized) by about a factor of 25. In addition, the spectral filter 42 is a dynamic spectral filter that can be tuned to pass both passive and active light from the target object which has a different wavelength (i.e., color) than the wavelength of the transmitted laser beam, thereby reducing backscatter. A fast spectral filter should be used for best SNR. One example of such a filter is the VariSpec™ liquid crystal tunable filters (commercially available from Channel Systems Inc., Pinawa, Manitoba, Canada). The transmission of N laser beams of different wavelengths provides laser speckle diversity to improve SNR by sqrt(N), as well as wavelength diversity. If a single wavelength is used, multiple frames can also provide such diversity. In such cases, faster speckle motion or boiling can be better, as long as the speckle does not smear much within a frame. Other options to aid in reconstruction include (a) stitching of the speckle phases of the subapertures using measurements that have overlap of speckle phase between subapertures due to speckle motion, and (b) sequential transmission or phasing of subapertures to identify each beam's profile and phase on target.

(6) The anisoplanatic image can be reconstructed using a nonlinear optimization process 84 (see FIG. 4).

(a) More specifically, the coherent returns provide speckle images for each subaperture, which when combined with the passive images or with multiple speckle images, allows separation of the speckle phase from the atmospheric phase (step 86). The result is a reconstruction of both the global atmospheric phase and the subaperture speckle phases.

(b) The subaperture speckle phase is unknown to within a piston for each subaperture (tip and tilt are known because of the registration of the passive image to the speckle image). The global speckle phase can be reconstructed from the subaperture speckle phases (step 88) using at least one of two methods: (a) use a forward model to adjust the pistons of the subaperture speckle phases to form a high-resolution match to the low-resolution subaperture images, and/or (b) use speckle motion from neighboring frames and subapertures to estimate overlap phases and "stitch" the phases together. Once the global speckle phase is found, a coherent image of the target object at full aperture may be created (step 88 in FIG. 4) by either the forward model or by back-propagating the coherent speckle phase to the object plane. This backward propagation can be done numerically using standard wave-optics algorithms and will create a coherent image of the target object. Successive full-aperture coherent images may be averaged to create an incoherent high-resolution image of the target object and the illuminated aimpoint region. This completes the process of forming a full-aperture high-resolution image to support high-quality aimpoint selection and maintenance.

(7) The same global speckle phase enables estimation of the laser piston phase from the lenslet array out to the target object. This piston, along with tip, tilt, and focus adjustments for each laser channel (step 90), can be applied with the hardware shown in FIGS. 2 and 3 to concentrate the laser light on a more precise aimpoint on the target object (step 78) for the purpose of damaging or destroying the target object.

Figure 5:
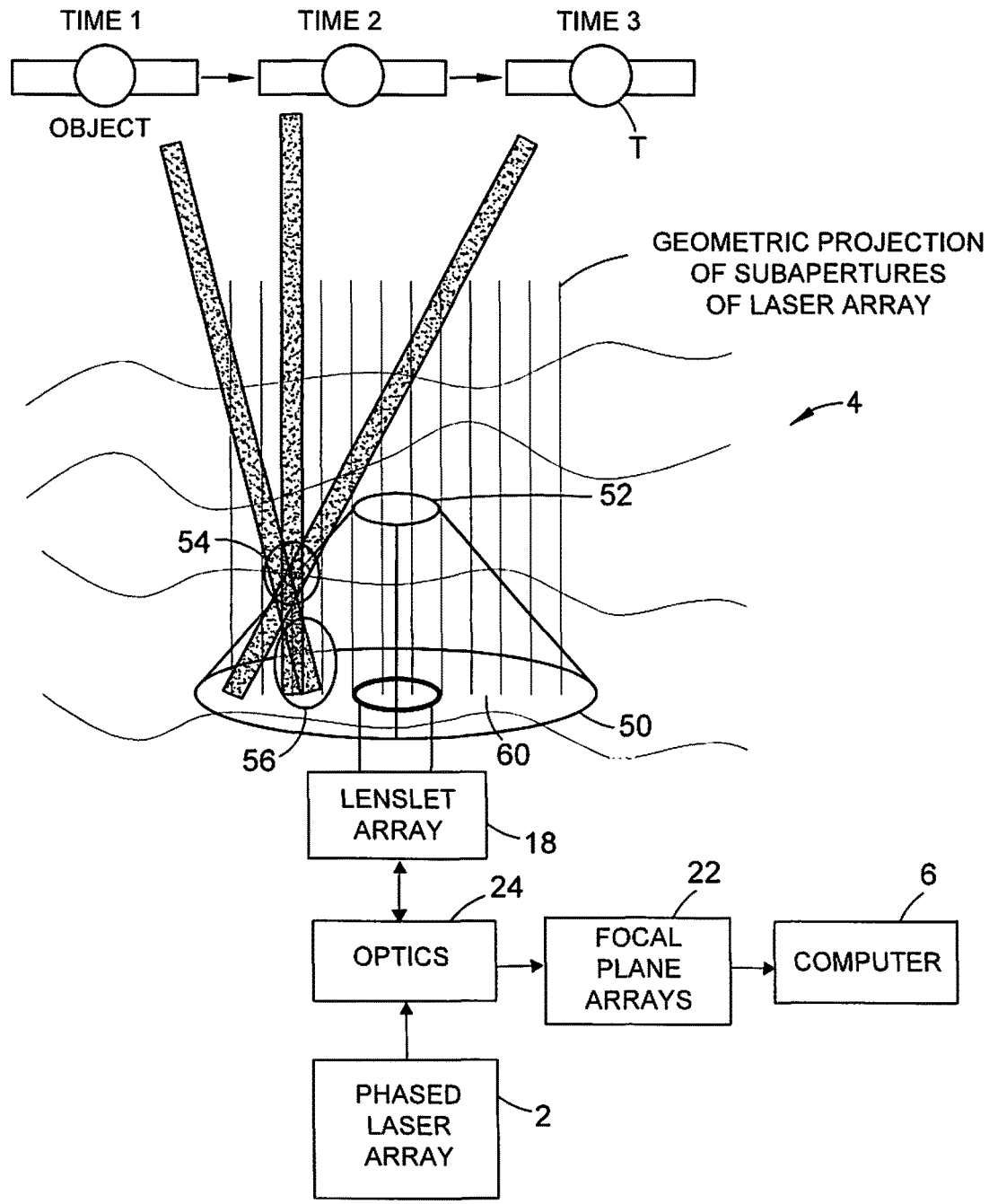
FIG. 5 is a diagram representing some components of a system for anisoplanatic imaging and beam control through the atmosphere over an extended field of view using a phased laser array. The target object is shown at three different positions over time. Circled regions indicate overlaps of multiple paths of light from the target object received by the system at different times that enable estimation of the 3-D atmospheric turbulence profile.

FIG. 5 is a diagram representing some components of the system described above. The target object T is shown at three different positions over time. Circled regions indicate overlaps of multiple paths of light from the target object received by the system at different times that enable estimation of the 3-D atmospheric turbulence profile. FIG. 5 shows a stationary atmosphere 4 and a target object T moving in the field of view of a telescope. The telescope comprises a primary mirror 50, defining a receive aperture or pupil 60, and a secondary mirror 52. Incident light on the primary mirror 50 is reflected toward the secondary mirror 52, which in turn reflects impinging light toward the lenslet array 18. The other system components depicted in FIG. 5 are the same as those previously described with reference to FIGS. 1 and 3.

The target object T, being viewed by the telescope, is shown in three different positions at Time 1, Time 2, and Time 3 respectively. The speckled bars in FIG. 5 depict respective "pipes" of light of varying phase originating from the target object T at Time 1, Time 2, and Time 3. [As used herein, the term "pipe" means a pipe-shaped volume of space along a line of sight to the object. The light from the object may have phase aberrations due to atmospheric turbulence in the pipe.] In the example depicted in FIG. 5, the phase pipes overlap (at different times) in two regions 54 and 56 indicated by respective ellipses. Light within the field of view is captured by the telescope and used to produce a passive image of the target object T. However, in the absence of compensation for the effects of intervening turbulence 4 (indicated by wavy lines in FIG. 5), that image could be blurred or otherwise distorted.

In accordance with one wavefront reconstruction implementation, the computer 6 can be programmed to calculate the local tilt of the wavefront across each lenslet from the position of the respective focal spot on a respective focal plane array 22. Any phase aberration can be approximated by a set of discrete tilts. By sampling the light passing through the lenslets, the tilts can be measured and any wavefront phase aberration can be approximated by the computer 6.

In the system depicted in FIG. 5, tip, tilt and focus diversity combined with object motion enable multi-path sampling of the atmospheric refractive index volume. This multi-path sampling enables the computer 6 to remove turbulence-induced distortions from a reconstructed object image using tomographic estimation of 3-D atmospheric turbulence. The operations performed by the computer 6 will be described in more detail below.

The motion of a target object T will result in phase samples of the atmosphere at varying angles as shown in FIG. 5. Phase is measured along "pipes" represented by speckled bars in FIG. 5; locations where the pipes intersect are indicated by ellipses in FIG. 5. Light emanating from the same object point at different times will encounter different volumes of turbulence that will induce differing phase aberrations and yield point spread functions having different shapes. The measurement of different, overlapping pipes in regions 54 and 56 in multiple directions creates multiple independent sums of phases over turbulence layers that can be solved using linear techniques to estimate the 3-D atmospheric phase volume.

With atmospheric phase tomography used in adaptive optics, collection of light at the wavefront sensor over multiple frames will sample multiple paths through the atmosphere and enable estimation of the volume of atmospheric turbulence. The same can be true for image reconstruction using a forward model to post-process measured data, provided that the forward model is formulated correctly. The measured data depends functionally on some underlying parameters, such as a pristine object profile. A forward model technique is an algorithm that can be used to estimate those underlying parameters, such as the object and the aberrations between the object and the receiver, by matching the measurements to the forward model prediction.

The image reconstruction approach adopted herein uses focal plane images and subapertures to reconstruct full-aperture wavefronts and full-aperture images in the focal plane. Known iterative maximization techniques can be used to determine the reconstructed object that is most consistent with the raw pixel-level data.

The approach disclosed above works best with a monolithic beam director. Without a monolithic beam director, it can still work if the imaging is fast enough to capture the phase variations associated with the "Venetian blind effect." It can do this without need for heterodyne approaches such as digital holography. Additional benefits of this approach are: (a) lower size, weight and power than other known approaches; (b) reduction of backscatter; (c) it solves the full-aperture imaging and aimpoint selection problem, and solves the phasing problem; and (d) it can work when the target object occupies multiple isoplanatic patches in stronger turbulence. The challenging aspects include the following: (1) the wavelength-shifting lasers, which are difficult to manufacture; and (2) the packaging of the focal plane arrays and liquid-crystal (or electro-optical) fast spectral filters should be compact; (3) the speed and timing of the wavelength transitions are challenging; and (4) the reconstructions must be done quickly, including fast real-time reconstruction processing of the needed optical path differences. The last requirement is partly mitigated because the subaperture reconstructions will involve reduced aberrations and low-resolution images over small subapertures, so that fast reconstructions may be realized. It can also be seen that small components, tight packaging, precision xyz motion control of the small diverging lens, and high-quality durable optical coatings are needed.

In summary, the approach proposed herein utilizes simple phased laser array hardware to: (a) estimate the full-aperture, high-resolution image of the target object; (b) select and maintain an aimpoint at high resolution; (c) compensate the wavefront of each laser channel with the phase required to concentrate light on the aimpoint of the object, despite anisoplanatic effects; and (d) overcome backscatter effects. This approach will work best when a single pointing gimbal is utilized for gross pointing of the full array over large angles, but may also work when multiple gimbals are used.

While systems and methods for anisoplanatic imaging of a target object with compensation for atmospheric turbulence-induced phase aberrations and then directing a laser beam onto the target object based on those phase aberrations have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. For example, the computer 6 and the control system 8 shown in FIG. 3 form a computer system. As used herein, the terms "computer" and "processor" both refer to devices having a processing unit (e.g., a central processing unit) and some form of memory (i.e., computer-readable medium) for storing a program which is readable by the processing unit. These terms are also intended to include digital and analog devices that perform signal processing functions, taking one or multiple signals in, applying mathematical functions and filtering to the signals, and generating one or multiple output signals.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system comprising a beam director and a multiplicity of laser channels arranged for transmitting light to and receiving light from said beam director, wherein each of said laser channels comprises:
    a laser for outputting a laser beamlet;
    a phase modulator for modulating a phase of the laser beamlet output by said laser;
    a polarizing beam splitter arranged such that a laser beamlet output by said laser will impinge on said polarizing beam splitter;
    a diverging lens arranged such that laser light transmitted through said polarizing beam splitter will impinge on said diverging lens, wherein said diverging lens is displaceable in three mutually orthogonal directions;
    a primary lenslet arranged such that laser light transmitted through said diverging lens will impinge on said primary lenslet and laser light transmitted through said primary lenslet will impinge on said beam director;
    a set of actuators for actuating displacement of said diverging lens in said three mutually orthogonal directions; and
    a focal plane array arranged such that light that passed through said diverging lens and then impinged on said polarizing beam splitter will impinge on said focal plane array, said focal plane array converting impinging light into electronic imaging data.

2. The system as recited in claim 1, wherein each laser channel further comprises a retro-reflector and a quarter-wave plate, said retro-reflector and said quarter-wave plate being disposed so that light from the laser that was reflected by said polarizing beam splitter will pass through said quarter-wave plate, impinge on said retro-reflector and be reflected back toward and through said quarter-wave plate and then through said polarizing beam splitter.

3. The system as recited in claim 2, wherein each laser channel further comprises a spectral filter disposed between said polarizing beam splitter and said focal plane array in a position whereat light that was reflected by said polarizing beam splitter toward the retro-reflector and then back will impinge on said spectral filter and light passed by said spectral filter will impinge on said focal plane array.

4. The system as recited in claim 2, wherein said polarizing beam splitter reflects only a horizontally polarized fraction of the laser beamlet output by said laser.

5. The system as recited in claim 3, wherein said spectral filter is tuned to pass a range of wavelengths which does not include a wavelength of light that is currently being output by said laser.

6. The system as recited in claim 3, wherein each laser channel further comprises a focusing lens disposed between said spectral filter and said focal plane array.

7. The system as recited in claim 1, further comprising:
    a multiplicity of sets of actuators for actuating mutually orthogonal displacements of a multiplicity of said diverging lens; and
    a computer system that receives incoherent imaging data from a multiplicity of said focal plane arrays, said computer system being programmed to transmit control data to said sets of actuators and phase data to said phase modulators, said control and phase data being derived from said incoherent imaging data by reconstructing full-aperture wavefronts using a multi-frame blind deconvolution algorithm, a forward model, or integration of subaperture tilts.

8. The system as recited in claim 7, wherein said computer system is further programmed to perform the following operations:
    control said sets of actuators to provide tip, tilt and focus control of said diverging lenses;
    control said phase modulators to adjust phases of laser beamlets output by said lasers; and
    control firing and wavelength of said lasers to output laser beamlets to said phase modulators,
    wherein said tip, tilt and focus control and said phase adjustments are designed to direct the laser beamlets toward an aimpoint on a target object in a field of view of said beam director with compensation for atmospheric turbulence-induced phase aberrations specific to a path to an aimpoint region, using a combination of focus diversity or phase tomography to estimate the phase.

9. A method for concentrating a laser beam formed by a laser array on an aimpoint on a target object in a field of view of a beam director, comprising:
    (a) acquiring a multiplicity of incoherent images of the target object while applying phase diversity and while the laser array is turned off;
    (b) reconstructing full-aperture wavefronts for each isoplanatic patch of the target object from said incoherent images using a combination of focus diversity or phase tomography based on subaperture image measurements;
    (c) reconstructing a multiplicity of subaperture images with reduced blurring due to phase aberrations from said incoherent images;
    (d) selecting a crude aimpoint close to or inside an aimpoint region based on said multiplicity of reconstructed subaperture images; and
    (e) firing a multiplicity of lasers using a reconstructed global phase appropriate for an isoplanatic patch around said crude aimpoint.

10. The method as recited in claim 9, further comprising:
    modulating phases of laser beamlets using gross-piston phase modulators; and
    positioning diverging lenses for tip/tilt and focus control for each laser channel.

11. The method as recited in claim 9, wherein step (e) comprises transmitting multiple laser beamlets having a same narrow-band wavelength from each laser using a duty cycle of no more than 50%.

12. The method as recited in claim 9, wherein step (e) comprises transmitting multiple laser beamlets having multiple narrow-band wavelengths from each laser, the method further comprising:
(f) recording coherent returns reflected from the target object to form speckle images for each laser channel;
(g) processing the speckle images and passive images to separate speckle phase from atmospheric phase, the result of which is a reconstruction of a global atmospheric phase and a multiplicity of subaperture speckle phases; and
(h) reconstructing a global speckle phase from said multiplicity of subaperture speckle phases.

13. The method as recited in claim 12, wherein step (h) comprises using a forward model to estimate and then adjust pistons of the subaperture speckle phases to match the speckle images.

14. The method as recited in claim 12, wherein step (h) comprises using speckle motion from neighboring frames and subapertures to estimate overlap phases and stitch the phases together.

15. The method as recited in claim 12, further comprising:
(i) creating a full-aperture coherent image of the target object based on said global speckle phase; and
(j) averaging successive full-aperture coherent images to create a full-aperture incoherent image.

16. The method as recited in claim 15, wherein step (i) comprises back-propagating the coherent speckle phase to an object plane.

17. The method as recited in claim 12, further comprising:
(k) estimating a laser piston phase from a lenslet array out to the target object based on said global speckle phase; and
(l) applying said piston, along with tip, tilt, and focus adjustments for each laser channel, to concentrate the laser beamlets on a more precise aimpoint inside the aimpoint region on the target object.

18. A system comprising a laser array, a lenslet array, a multiplicity of focal plane arrays, a multiplicity of polarizing beam splitters, and a multiplicity of sets of actuators, wherein:
said laser array comprises a multiplicity of phase modulators;
said lenslet array comprises a multiplicity of diverging lenses, each of said diverging lens being independently displaceable in three mutually orthogonal directions by a respective set of said multiplicity of sets of actuators;
said polarizing beam splitters are respectively disposed between a respective laser of said laser array and a respective diverging lens such that a respective laser beamlet output by said respective laser will first pass through a respective polarizing beam splitter and then pass through a respective diverging lens;
said focal plane arrays are respectively arranged such that light that has passed through a respective diverging lens and then impinged on a respective polarizing beam splitter will impinge on said respective focal plane array, said focal plane arrays converting impinging light into electronic imaging data; and
a computer system receives incoherent imaging data from said focal plane arrays, said computer system being programmed to transmit control data to said multiplicity of said sets of actuators for causing displacements of said diverging lenses and phase data to said phase modulators for setting the overall subaperture phase, said control data and phase data being derived from said incoherent imaging data by reconstructing full-aperture wavefronts using a multi-frame blind deconvolution algorithm, a forward model, or integration of subaperture tilts.

19. The system as recited in claim 18, wherein said computer system is further programmed to perform the following operations:
control said sets of actuators to provide tip, tilt and focus control of said diverging lenses; and
control firing of said lasers to output laser beamlets,
wherein said tip, tilt and focus control are designed to direct the laser beamlets toward an aimpoint on a target object with compensation for said atmospheric turbulence-induced phase aberrations.

* * * * *